United States Patent
Boucadair et al.

(10) Patent No.: US 10,582,020 B2
(45) Date of Patent: Mar. 3, 2020

(54) METHOD FOR MULTIPATH TCP COMMUNICATION BETWEEN TWO TERMINALS

(71) Applicant: Orange, Paris (FR)

(72) Inventors: Mohamed Boucadair, Betton (FR); Christian Jacquenet, Pont-Pean (FR)

(73) Assignee: ORANGE, Paris (FR)

( * ) Notice: Subject to any disclaimer, the term of this patent is extended or adjusted under 35 U.S.C. 154(b) by 432 days.

(21) Appl. No.: 15/327,162

(22) PCT Filed: Jul. 8, 2015

(86) PCT No.: PCT/FR2015/051889
§ 371 (c)(1),
(2) Date: Jan. 18, 2017

(87) PCT Pub. No.: WO2016/012687
PCT Pub. Date: Jan. 28, 2016

(65) Prior Publication Data
US 2017/0163774 A1 Jun. 8, 2017

(30) Foreign Application Priority Data

Jul. 21, 2014 (FR) ..................................... 14 57038

(51) Int. Cl.
*H04L 29/06* (2006.01)
*H04L 29/08* (2006.01)

(52) U.S. Cl.
CPC .............. *H04L 69/14* (2013.01); *H04L 67/34* (2013.01); *H04L 67/42* (2013.01); *H04L 69/163* (2013.01)

(58) Field of Classification Search
CPC ......... H04L 69/14; H04L 67/34; H04L 67/42; H04L 69/163
See application file for complete search history.

(56) References Cited

U.S. PATENT DOCUMENTS

2011/0296006 A1* 12/2011 Krishnaswamy ....... H04L 45/00
709/224
2012/0020248 A1* 1/2012 Granlund .............. H04W 28/18
370/254

(Continued)

OTHER PUBLICATIONS

A. Ford, TCP Extensions for Multipath Operation with Multiple Addresses, Jan. 2013, Internet Engineering Task Force (IETF), Request for Comments: 6824 (Year: 2013).*

(Continued)

*Primary Examiner* — Wing F Chan
*Assistant Examiner* — Billy H Ng
(74) *Attorney, Agent, or Firm* — Knobbe, Martens, Olson & Bear, LLP

(57) ABSTRACT

One embodiment relates to an IP network communication method comprising a communicating device configured to perform a simple transmission control protocol connection and to implement a multipath TCP connection discovering at least one test server that is configured to implement a multipath TCP connection. The communicating device or the test server attempts to set up at least one multipath TCP connection with the test server or with the communicating device along at least one path enabling the communicating device to be reached. The communicating device registers the status of the path concerning its compatibility with multipath TCP connections.

14 Claims, 3 Drawing Sheets

(56) References Cited

U.S. PATENT DOCUMENTS

| | | | | |
|---|---|---|---|---|
| 2013/0318239 A1* | 11/2013 | Scharf | ............... | H04L 69/16 709/224 |
| 2014/0362765 A1* | 12/2014 | Biswas | ............... | H04L 45/24 370/328 |
| 2015/0103663 A1* | 4/2015 | Amini | ............... | H04W 28/0215 370/235 |
| 2015/0365250 A1* | 12/2015 | Sun | ............... | H04W 76/14 370/328 |

OTHER PUBLICATIONS

Boucadair et al. Mar. 4, 2015. MPTCP Connectivity Checks. Retrieved from the Internet Apr. 1, 2015, from http://tools.ietf.org/pdf/draft-boucadair-mptcp-connectivity-checks-00.pdf, 9 pages.

Deng et al. May 29, 2014. Use-cases and Requirements for MPTCP Proxy in ISP Networks. Internet Engineering Task Force, IETF, 19 pages.

Ford et al. Jan. 2013. TCP Extensions for Multipath Operation with Multiple Addresses. RFC6824. Internet Engineering Task Force (IETF), 64 pages.

Wing et al. Oct. 7, 2013. Multipath TCP (MPTCP) Path Selection using PCP. Internet Engineering Task Force (IETF), 10 pages.

Information Sciences Institute, University of Southern California. Internet Engineering Task Force (IETF). Sep. 1981. RFC793, Transmission Control Protocol, DARPA Internet Program, Protocol Specification. Retrieved from the Internet on Jan. 16, 2017 at //tools.ietf.org/html/rfc793, 90 pages.

Scharf et al. Mar. 2013. Multipath TCP (MPTCP) Application Interface Considerations. Internet Engineering Task Force (IETF), RFC6897, 31 pages.

International Search Report dated Oct. 19, 2015 for International Application No. PCT/FR2015/051889 filed Jul. 8, 2015, 6 pages.

Written Opinion dated Oct. 19, 2015 for International Application No. PCT/FR2015/051889 filed Jul. 8, 2015, 5 pages.

\* cited by examiner

METHOD FOR MULTIPATH TCP COMMUNICATION BETWEEN TWO TERMINALS

RELATED APPLICATIONS

This application is the U.S. National Phase of Application No. PCT/FR2015/051889 entitled "METHOD FOR MULTIPATH TCP COMMUNICATION BETWEEN TWO TERMINALS" filed Jul. 8, 2015, which designated the United States, and which claims the benefit of French Application No. 1457038 filed Jul. 21, 2014.

The present invention relates to the field of telecommunications, and in particular communications networks suitable for implementing the Internet protocol (IP). More particularly, the present invention relates to supplying "added-value" services in IP networks, i.e. networks that are capable of performing differentiated treatments depending on the nature of the data traffic conveyed in the network.

The invention applies to any type of client device such as a fixed or mobile terminal, or a residential gateway or a business gateway, or an operator gateway, or indeed a TV decoder (also known as a "set-top-box" (STB)). For reasons of concision, a client device of any type is often referred to below as a "terminal".

Terminals, such as smartphones and personal computers (PC) are nowadays capable of activating and using a plurality of logic interfaces associated with one or more physical interfaces. Such terminals are said to be multi-interface (MIF) terminals. When a terminal has a plurality of interfaces capable of connecting to different access networks (e.g.: fixed, mobile, or wireless local area network (WLAN)), it benefits from access that is said to be "hybrid" since it combines different access network technologies.

A plurality of IP addresses can then be allocated to such MIF terminals so that they can connect to different types of network, such as a fixed network, a mobile network, or a WLAN, in simultaneous manner or in deferred manner. These IP addresses may:

belong to the same family of addresses or to two different families of addresses (IPv4, IPv6, or both);
have different lifetimes;
have different coverage ranges, e.g. a private IPv4 address, a unique IPv6 address having local range (unique local address or (ULA)), or an IPv6 address of global range (global unicast address (GUA)); and
be allocated to the same logic network interface or to different logic network interfaces.

Nevertheless, is should be observed that the "MIF" characteristic is volatile, since the capability of using a plurality of interfaces depends on network connection conditions, on the location of the device, or on other factors. In particular, a MIF device can make use of the plurality of interfaces available to it while setting up a simple connection (i.e. a connection that is set up along a single path to a given party), or indeed after setting up a simple connection. It should also be observed that a device does not know a priori whether it is possible to use a plurality of distinct paths for setting up a connection with a given party; more precisely, the device acquires this information (where applicable) only at the end of a stage during which it attempts to set up a connection using multiple paths with that party.

It should be recalled that a "multipath connection" is a connection set up between two devices making use simultaneously of one or more paths between the two devices. Such a connection applies a dedicated protocol such as multipath TCP (MPTCP), which may be defined as being an extension of a previously-defined transport protocol such as transmission control protocol (TCP). In other words, a multipath connection is an aggregation of one or more simple connections using a single path or paths that are different (partially or completely disjoint).

It should also be recalled that the TCP protocol, as defined in particular in the Internet engineering task force (IETF) specification RFC 793, is one of the main protocols used by terminals connected to an IP network (e.g. the Internet), such that the literature often mentions the "TCP/IP" protocol suite. The TCP protocol makes it possible in reliable, ordered, and error-free manner to convey a digital data stream between applications that are being executed on terminals connected to a local network (e.g. an Intranet) or to the Internet. It operates at the transport layer level of the open source interconnection (OSI) model. Web browsers use the TCP protocol when they connect to remote servers; the TCP protocol is also used for conveying email or for transferring files from one location to another. Protocols such as HTTP, HTTPS, SMTP, POP3, IMAP, SSH, FTP, Telnet, and numerous other protocols are transported over TCP connections. A TCP connection is identified by the address and the port number of the source terminal and by the address and the port number of the destination terminal.

Two terminals may insert so-called "TCP options" in the TCP messages they exchange, e.g. in order to optimize the quality of TCP transmission. Such options occupy the space available at the end of the TCP header, and they are of a length that is expressed in octets. The kind of option is a unique identifier describing the nature of the TCP option. For example, the value "0" indicates the end of the list of options, and the value "2" indicates the maximum size of the TCP segment, referred to as the maximum segment size (MSS).

The arrival of MIF terminals introduces additional complexity for using some or all of the IP addresses allocated via the available networks. In particular, given that TCP connections are associated with an IP address and a port number, any modification to this information will penalize the operation of an on-going TCP connection, and as a result the operation of the service using said TCP connection. Such a change is particularly troublesome when the terminal is given a new IP address, either because the terminal is connecting to another network or indeed when the interface at which the IP address is associated is no longer available. For example, means for informing a remote TCP party that an IP address is no longer valid are then required in order to ensure that a remote connection is maintained.

In 2009, the IETF commissioned the mptcp workgroup in order to specify extensions to the TCP protocol capable of accommodating constraints imposed by the possibility of allocating a plurality of IP addresses to various physical or logical interfaces of a terminal. That workgroup has published initial specifications for the MPTCP protocol (cf. A. Ford, C. Raiciu, and M. Handley "TCP extensions for multipath operations with multiple addresses", RFC 6824, January 2013), and some smartphones and operating systems are already capable of implementing them. The IETF expects to raise the status of present-day MPTCP "specifications" so that they become genuine "standards" in the meaning of the IETF.

The MPTCP protocol has thus been proposed to minimize any risk of a TCP connection being interrupted in untimely manner associated with such changes of addressing, and more generally to satisfy the requirements made necessary by a context in which a terminal has the ability to connect to one or more networks via one or more interfaces. The MPTCP protocol serves in particular to satisfy the need to ensure session continuity for a terminal that is mobile. Various circumstances of use can be envisaged for the MPTCP protocol, such as:
- transferring traffic between a plurality of WLAN access points;
- off-loading a mobile network, and transferring traffic to a WLAN access point;
- aggregating a plurality of access links;
- sharing load between a plurality of paths; and
- optimizing the use of network resources.

In this respect, it should be recalled (cf. Wikipedia) that in the field of networks "aggregating links" is a concept describing grouping together a plurality of network interfaces as though there was a single interface, in order to increase data rate beyond the limits of a single link, and possibly in order to ensure that other interfaces take over if a link fails (redundancy principle).

A particularly advantageous example application of the MPTCP protocol is transferring voluminous files while using the resources of the file transfer protocol (FTP). A device acting as an FTP client can make use dynamically of all of the available paths that enable that device to access an FTP server, providing the server is suitable for making use of the various MPTCP connections set up by the FTP client. The time required to transfer data is thus significantly reduced compared with a TCP connection.

In the context of MPTCP, the term "sub-flow" is used to designate a TCP connection that relies on using one of the available IP address and port number pairs. As a result, an MPTCP connection is an aggregation of TCP sub-flows. By way of example, FIG. 1 shows an MPTCP connection between a terminal A and a terminal B; the initial sub-flow is set up between address A1 of terminal A and address B1 of terminal B; subsequently, an additional sub-flow is set up between address A2 of terminal A and address B1 of terminal B.

Operating systems present applications with dedicated interfaces known as application programming interfaces (APIs) enabling them to interact with the TCP and IP layers. The conventional API presented to TCP/IP applications is the "socket" interface. A "socket" is characterized by a plurality of "attributes" such as "local socket address", "remote socket address", and "protocol". New extensions (MPTCP API) have been specified by the IETF in document RFC 6897 to enable applications to control MPTCP connections. It should be observed that the MPTCP API is an extension of the TCP API.

The term "MPTCP connection table" designates a software structure used to group together all of the TCP sub-flows associated with a given MPTCP connection. Several attributes can be used for characterizing an MPTCP connection table. In addition to the above-mentioned conventional TCP/IP attributes, values are given to attributes that are specific to the MPTCP protocol. The values of these attributes of the connection table are controlled via the MPTCP API.

An MPTCP connection is initialized like any conventional TCP connection, except that the MP_CAPABLE option (meaning that the sender terminal is compatible with MPTCP protocol) is included in the message containing the connection initialization flag (SYN) and in the subsequent messages. An MPTCP terminal can inform the remote terminal about the availability of an additional IP address by using the ADD_ADDR TCP option without necessarily creating an associated sub-flow.

Nevertheless, signaling a plurality of IP addresses that are available and suitable for use for communicating with a party can lead to failure to set up certain TCP sub-flows because the external IP addresses as perceived by the remote terminals need not be the same as those that are visible locally. That is why the ADD_ADDR option of the MPTCP protocol includes an address identifier (address ID) that is used for identifying an available IP address without ambiguity. In the state of the art, this provision is supposed to avoid problems induced by the presence of a network address translator (NAT) on the path followed by the packets between the two terminals that have set up an MPTCP connection. The ADD_ADDR option is also used for transmitting a port number in the event of one of the MPTCP terminals not using the same port number for all of the available IP addresses.

Likewise, the MPTCP protocol has provisions that are intended specifically to make it possible to pass through firewalls. More precisely, the specification of the MPTCP protocol stipulates that the sequence numbers as indicated in the TCP header are specific to each sub-flow, while the sequence number given in the data sequence signal (DSS) TCP option of the MPTCP protocol serves to associate these sub-flows with the same MPTCP connection.

The MPTCP protocol seeks to be unaffected by the constraints imposed by the massive proliferation in present-day networks of "middle boxes" (i.e. service functions inserted in a communication chain) such as NATs, and firewalls. In addition, document RFC 6824 makes provision that in the event of a failure of an attempt to set up an MPTCP connection, the connection transforms automatically into a simple TCP connection.

Unfortunately, in spite of all those precautions, other problems can arise when attempting to set up an MPTCP connection. For example:
- certain MPTCP options, or indeed all of them, may be filtered (i.e. removed) by service functions, such as a NAT or a firewall, situated in series between two MPTCP peers, as shown in FIG. 2;
- even if the above-mentioned SYN messages of the MPTCP are successfully exchanged between two MPTCP peers, service functions situated in series between two peers can filter the above-mentioned DSS options from the data packets; under such circumstances, and as shown in FIG. 3, the attempt at setting up an MPTCP connection cannot succeed, with the consequence of falling back on a simple TCP connection, as in the situation shown with reference to FIG. 2; and
- it may happen that a first TCP sub-flow is established successfully, but that multiple sub-flows fail to be set up for lack of other paths that are compatible with the MPTCP protocol.

The authors of the present invention have found that, under such conditions, the presence of such service functions has the effect of significantly lengthening the time required for setting up TCP sub-flows, and consequently has a negative impact on the quality of service of a communication, as perceived by the user.

The present invention thus provides an IP network communication method comprising the following steps:
- a communicating device that is suitable for performing a simple transmission control protocol connection and for implementing a multipath TCP connection discovering at least one test server that is suitable for implementing a multipath TCP connection;

said communicating device or said test server attempting
to set up at least one multipath TCP connection with the
test server or with the communicating device along at
least one path enabling the communicating device to be
reached; and the communicating device registering the status of said
path concerning its compatibility with multipath TCP
connections.

The communicating devices to which the invention applies may be of any type, e.g. a residential gateway, a router, or a terminal, and they may be MIF devices or single-interface devices.

By means of the invention, a communicating device can:
discover the capabilities of any service functions, such as
a NAT or a firewall, situated in series on a path enabling
the communicating device to be reached, specifically in
order to be able to establish whether any such service
function filters or modifies multipath TCP options (in
the context of the present invention, the term "multi-
path TCP options" is used to mean a TCP option
defined by the multipath connection protocol in use);
register accordingly the status of the path, i.e. its com-
patibility or non-compatibility with multipath connec-
tions; and
prior to making any attempt to connect with a given party,
anticipate failure of a multipath TCP connection with
that party along a given path connecting the commu-
nicating device to the party.

The communicating device thus knows in advance while setting up a connection with a party whether it can set up a multipath connection along that path or whether it must make do with a simple TCP connection. This results in a reduction in the time required to set up a connection, and thus, naturally, to a user experience of significantly improved quality.

Furthermore, such a communicating device can:
adjust its behavior as a function of how it is attached to a
network (e.g. when attached to a new network, non-
availability of a network interface, or detecting a ser-
vice function); and
decide, without any risk of degrading the quality of
communication with the other party, to activate a
multipath connection or to deactivate an ongoing mul-
tipath connection or all ongoing multipath connections,
or indeed to add a new TCP sub-flow to an ongoing
multipath connection.

According to particular characteristics, during said step of attempting to set up a multipath TCP connection, said communicating device determines whether the multipath TCP options sent by the communicating device or by said test server have been received correctly by the test server or by the communicating device, by exchanging test data with the test server.

By means of these provisions, the communicating device can conveniently determine the compatibility or the non-compatibility of said path with multipath TCP connections.

According to other particular characteristics, said communicating device may, for example, comprise:
a client device suitable for implementing a multipath TCP
connection; or
a relay device suitable for implementing a multipath TCP
connection and connected to a client device, itself
suitable or not suitable for implementing a multipath
TCP connection.

Thus, the invention can be implemented by a client device having one or more external addresses, or one or more network interfaces (which may be logical or physical). The client device could equally well have only one interface if it is situated behind a relay device (such as a residential gateway or a router) that is itself connected to one or more networks compatible with multipath connections.

According to even more particular characteristics, if the client device suitable for implementing a multipath TCP connection observes that none of the paths enabling the client device to be reached is compatible with multipath TCP connections, the method further comprises a step during which said client device uses the simple TCP transport mode to:
set up a connection with another client device; or
connect to another client device after receiving a message
for setting up a multipath connection sent by that other
client device.

These provisions serve to avoid the delay that might be caused by attempting to set up a multipath connection along a path that is incompatible with such a connection.

In contrast, if a client device suitable for implementing a multipath TCP connection observes that at least one of the paths enabling the client device to be reached is compatible with multipath TCP connections, the method further comprises a step during which said client device uses multipath TCP options to set up connections with another client device along said path that is compatible with multipath TCP connections.

In particular, the two peers can set up a multipath connection between them along a path that was previously considered as being incompatible with such a connection, if there has been a change to the circumstances that previously led to a fallback to a simple TCP connection.

It should be observed that the invention may be implemented even when the client device knows only one path for communicating with a given party; it should be recalled that the potential availability of multiple paths is determined only when setting up a connection with the party. The invention is preferably performed for each of the possible communication paths between the two client devices, after the path has been discovered by one or the other of the client devices; this enables maximum benefit to be obtained from the possibilities made available by multipath connections.

Furthermore, said multipath connection may advantageously comply with the MPTCP protocol, so as to benefit from the provisions of that protocol as mentioned briefly above.

Correspondingly, the invention also provides various devices.

Thus, it firstly provides a communicating device possessing means for implementing a simple TCP connection and for implementing a multipath TCP connection. Said communicating device is remarkable in that it further possesses means for:
discovering at least one test server suitable for imple-
menting a multipath TCP connection;
sending to said test server a request to set up a multipath
TCP connection;
attempting to set up at least one multipath TCP connection
with said test server along at least one communication
path between them; and
registering the status of said path concerning its compat-
ibility with multipath TCP connections.

According to particular characteristics, said means for attempting to set up a multipath connection with said test server include means for determining whether the multipath TCP options sent by the communicating device or by said test server have been correctly received by the test server or by the communicating device, by exchanging test data with the test server.

According to other particular characteristics, when the communicating device comprises a client device suitable for performing a multipath TCP connection, it further includes means:
observing that none of the paths enabling said client device to be reached is compatible with multipath TCP connections; and
using the simple TCP transport mode:
to set up a connection with another client device; or
to connect to another client device after receiving a message for setting up a multipath connection sent by that other client device.

In addition, or in a variant, the client device further comprises means for:
observing that at least one of the paths enabling said client device to be reached is compatible with multipath TCP connections; and
using multipath TCP options to set up connections with another client device along said path that is compatible with multipath TCP connections.

According to yet other particular characteristics, when the communicating device comprises a relay device suitable for implementing a multipath TCP connection and connected to a client device suitable or not suitable for implementing a multipath TCP connection, the communicating device further comprises means for:
observing that none of the paths enabling said relay device to be reached, other than its connection to said client device, is compatible with multipath TCP connections; and
if it receives a message for initializing a multipath connection from said client device, responding to the client device without including any multipath TCP option in its response.

By means of these provisions, the client device to which the relay device is connected then switches over immediately to a simple TCP connection.

The advantages made available by these communicating devices are essentially the same as those made available by the corresponding methods set out briefly above.

Secondly, the invention also provides a test server possessing means for implementing a multipath transmission control protocol connection, together with means for:
receiving a request to set up a multipath TCP connection from a communicating device; and
attempting to set up at least one multipath TCP connection with said communicating device along at least one communication path between them.

Said test server is remarkable in that said means for attempting to set up a multipath connection with the communicating device comprise means for exchanging test data with the communicating device enabling the communicating device to determine whether the multipath TCP options sent by the communicating device or by the test server have been correctly received by the test server or by the communicating device.

The advantages made available by this test server are essentially the same as those made available by the corresponding methods set out above briefly.

It should be observed that it is possible to make these various devices in the context of software instructions and/or in the context of electronic circuits.

The invention also provides a computer program downloadable from a communications network and/or stored on a computer-readable medium and/or executable by a microprocessor. The computer program is remarkable in that it comprises instructions for executing steps of the communications method set out briefly above, when executed on a computer.

The advantages made available by the computer program are essentially the same as those made available by said method.

Other aspects and advantages of the invention appear on reading the following detailed description of particular implementations given as non-limiting examples. The description refers to the accompanying figures, in which:

FIG. 1, described above, shows an aggregation of TCP sub-flows forming a single MPTCP connection;

FIG. 2, described above, shows the failure of an attempt at setting up a TCP sub-flow to the terminal B from a terminal A as a result of MPTCP options being filtered by service functions;

FIG. 3, described above, shows the failure of an attempt at setting up a TCP sub-flow to the terminal B from a terminal A as a result of DSS options filtered by service functions;

Figure 1:
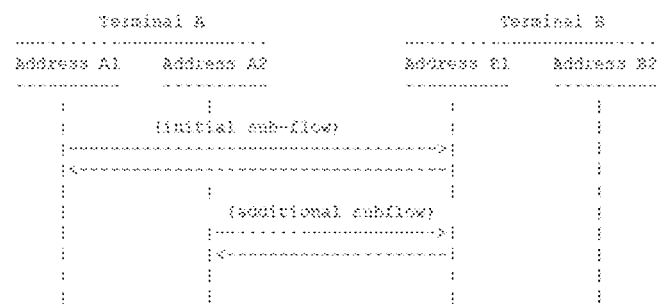
Figure 2:
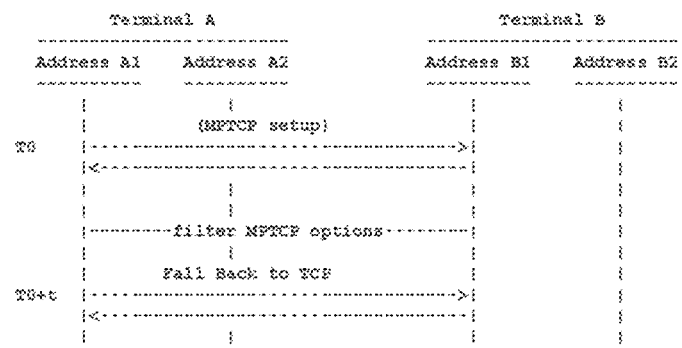
Figure 3:
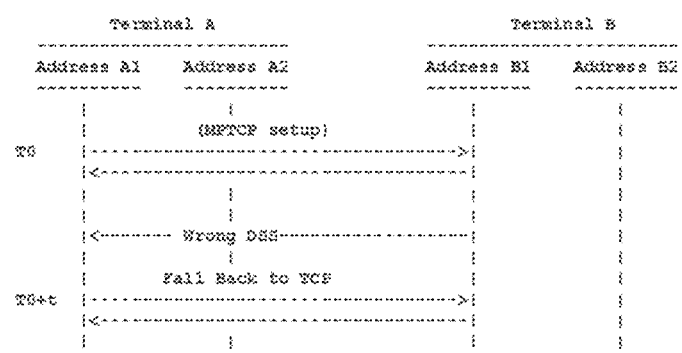

By way of example, the discovery of the various paths connecting a given terminal to a given party may be achieved by using a dynamic IP address allocation protocol such as dynamic host configuration protocol (DHCP), or by a mapping creation mechanism such as port control protocol (PCP), universal plug and play (UPnP), Internet gateway device (IGD), or session traversal utilities for NAT (STUN). In this respect, it should be recalled that a "mapping" designates the association between an internal IP address and an internal port number with an external IP address and an external port number. With a NAT, the internal IP address and the internal port number are input data items, while the external IP address and the external port number are allocated by the NAT. With a firewall, the internal and external information is identical. A mapping may include other information, such as the IP address and the port number of the party or an identifier of the communications protocol in use.

It should be observed that the invention may be implemented both by a first client device and by a second client device with which the first client device seeks to establish a multipath connection, or by only one of them; when established by only one of them, the other client device may optionally perform a method other than the method of the invention in order to discover the multipath connection compatibility of the paths connecting together these two client devices.

The invention proposes a novel attribute to be included in multipath connection tables. This attribute is referred to as "PATH_CHECKED" and it is set to "1" to indicate that a path is compatible with multipath connections, and it is set to "0" otherwise.

The invention also proposes deploying at least one test server (referred to as "CHECK_SERVER") suitable for performing the present invention, and having in particular the role of assisting a terminal in determining whether the service functions (e.g. NAT or firewall) situated in series on the paths for reaching this terminal are compatible with multipath connections. It should be observed that:

this test server is a device that is compatible with multipath connections;

it is possible to deploy one or more test servers for this purpose; in particular, there is no need for all of the terminals to make use of the same test server, and there is no need for a given terminal to make use of the same test server when network attachment conditions for that terminal change; and these test servers are not necessarily located in the same network domain as the terminal; in other words, a test server may be located in a network domain that is different from the network domain to which the terminal is connected; these two network domains may thus be placed under the management responsibility of two distinct administrative entities, providing that does not inhibit the capacity of the terminal to make use of such a test server connected to a domain other than the domain to which the terminal is connected for the purpose of qualifying the compatibility of the various available multiple paths with setting up multipath connections or TCP sub-flows.

The invention applies in general manner to any protocol relating to multipath TCP connections. There follows a description of the invention being applied to the MPTCP protocol as described briefly above. In particular, the above-mentioned MPTCP API needs to be modified so as to make it possible to transmit the values of the PATH_CHECKED attribute of the invention to applications.

In conventional manner, the MPTCP protocol has various provisions, including in particular definitions of the following TCP options:

MP_CAPABLE: this option is used to inform the remote terminal that the sending terminal is compatible with MPTCP options;

ADD_ADDR: this option is used to add a new address; it includes an optional two-octet field serving also to provide a port number, where appropriate;

REMOVE_ADDR: this option is used for removing an address;

MP_PRIO: this option is used for modifying the priority of a connection;

MP_JOIN: this option is used for identifying the TCP connection that is associated with setting up a new sub-flow;

MP_FAIL: this option is used to return to TCP mode without MPTCP options; and

MP_FASTCLOSE: this option is used for closing an MPTCP connection quickly.

The MPTCP protocol may be activated in several modes:

native mode: two MPTCP terminals set up all of the sub-flows that correspond to the available address and port numbers, and make use of all of these sub-flows;

primary mode: two MPTCP terminals signal sub-flows, but only a subset of these sub-flows is actually used for transferring data;

secondary mode: in the event of the "primary" sub-flow subset being unavailable (or overloaded), a "secondary" subset of sub-flows is then requested to ensure continuity of the MPTCP connection; and fallback mode: two MPTCP terminals use a single sub-flow; in the event of failure, traffic is transferred to a new sub-flow that is created for this purpose.

There follows a description of an implementation of the communication method of the invention.

By way of example, this implementation may be performed when starting a terminal, or on each change in the attachment conditions of a terminal to the network (e.g. becoming attached to a new network), or indeed as a result of a terminal detecting a new path. It includes a test stage giving results that are preferably saved in a local cache; the PATH_CHECKED attribute may be used for this purpose.

During a step E1, a terminal T discovers a test server CHECK_SERVER:

if an address of the test server CHECK_SERVER has been explicitly configured in the terminal T, the terminal T uses this address in order to contact the test server;

if no address is explicitly configured in the terminal T, the terminal T uses a well-known address (WKA) of the "anycast" type, or of the well-known domain name (WKDN) type, in order to simplify the operations of configuring and discovering CHECK_SERVER servers by the terminals; in this respect, it should be recalled that in the so-called "anycast" message broadcast mode, each destination address identifies a determined set of receivers, but only one of the receivers is selected to receive a message at a given moment from a given transmitter, the selected receiver generally being the receiver that is the shortest distance (in the IP routing sense) away from the transmitter.

During a step E2, the terminal T acts for at least one path suitable for reaching the terminal to execute a test procedure on said path by using at least one CHECK_SERVER server; as mentioned above, a terminal may execute this test procedure either with a single CHECK_SERVER server or with a plurality of CHECK_SERVER servers in order to improve the quality of the tests and the pertinence of the results.

The terminal T preferably performs this test procedure whenever the terminal restarts, or whenever attaching to a new network, or indeed whenever a new path is discovered enabling the terminal T to be reached.

Furthermore, the terminal T preferably performs this test procedure for all of the paths known to the terminal T. The procedure for testing a plurality of paths may be performed separately (i.e. by setting up as many MPTCP connections as there are available multiple paths), or collectively within a single MPTCP connection (i.e. by adding TCP sub-flows to a main MPTCP connection, these sub-flows corresponding to multiple paths other than the path used for setting up the main MPTCP connection).

The test procedure comprises the terminal T or the server CHECK_SERVER initializing at least one MPTCP connection along at least one communication path between them. The terminal T and the server CHECK_SERVER exchange test data in order at least:

to determine whether the TCP options (in particular the DSS options) sent by the terminal T (or by the server CHECK_SERVER) have been correctly received by the server CHECK_SERVER (or the terminal T); and to verify the behavior of the service functions situated in series on said path concerning the processing of MPTCP options, and in particular, to determine whether the MPTCP options sent by the terminal T (or by the server CHECK_SERVER) have been correctly received by the server CHECK_SERVER (or by the terminal T).

By way of example, the terminal T may conclude that an anomaly has been detected by the server CHECK_SERVER on the basis of observing that the server CHECK_SERVER has switched to simple TCP mode. The terminal T can also detect locally that at least one of the paths is not compatible with MPTCP communications, in particular when it is the server CHECK_SERVER that initialized an MPTCP connection or a TCP sub-flow.

Thereafter, during a step E3:
  if no anomaly is detected by the terminal T or by the server CHECK_SERVER, the terminal T updates its multipath table by setting the PATH_CHECKED attribute to "1" in order to indicate that said path is compatible with the multipath communication mode; else
  if an anomaly is detected by the terminal T or by a test server CHECK_SERVER, the terminal T updates its multipath table by checking the PATH_CHECKED attribute to "0" in order to indicate that the path is not compatible with the multipath communication mode.

After performing above steps E1 to E3:
  if none of the paths enabling the terminal T to be reached is compatible with MPTCP connections (i.e. if the PATH_CHECKED attribute of each of the multiple paths for all of the network interfaces of the terminal T is set to "0"):
    the terminal T uses the simple TCP transport mode to set up outgoing connections with other TCP parties (i.e. the multipath TCP mode is deactivated by this terminal until its network attachment conditions are favorably modified); and
    for an incoming multipath connection, the terminal T does not include MPTCP options in its messages for the other party (in other words, the terminal behaves as though it was not MPTCP-compatible); when the other party receives such a message without MPTCP options from the terminal T, the other party switches over immediately to a simple TCP connection, in compliance with the conventional "fallback" mode;
  in contrast, if at least one path exists that is compatible with MPTCP connections (i.e. if the PATH_CHECKED attribute of at least one of the multiple paths is set to "1"), the terminal T uses the MPTCP options to set up multipath connections with another party over the compatible path(s); furthermore, the terminal T does not announce to that other party any paths that are incompatible with MPTCP connections, so as to avoid any failure of an attempt at setting up a multipath connection over an incompatible path.

Figure 4:
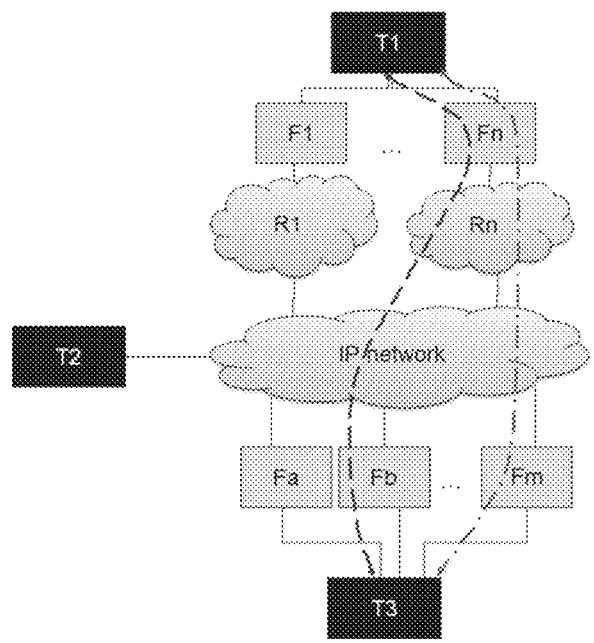
FIG. 4 shows an example network configuration having three terminals T1, T2, and T3.

FIG. 4 shows a network configuration having three terminals T1, T2, and T3. In this figure there can be seen:
  a terminal T1 connected to one or more IP networks via n connection nodes (F1, F2, . . . , Fn) and n respective access networks R1, R2, . . . , Rn; these connection nodes may host service functions such as a NAT or firewall, or they may be IP routers that do not include any advanced service functions such as a NAT or a firewall;
  a terminal T2 connected to an IP network via a single connection node; it is assumed that T2 is compatible with MPTCP, and that a single IP address has been allocated thereto; and
  a terminal T3 connected to one or more IP networks via m connection nodes (Fa, Fb, . . . , Fm); these nodes may host service functions such as a NAT or a firewall, or they may be IP routers that do not include any advanced service function such as a NAT, or a firewall.

Figure 5:
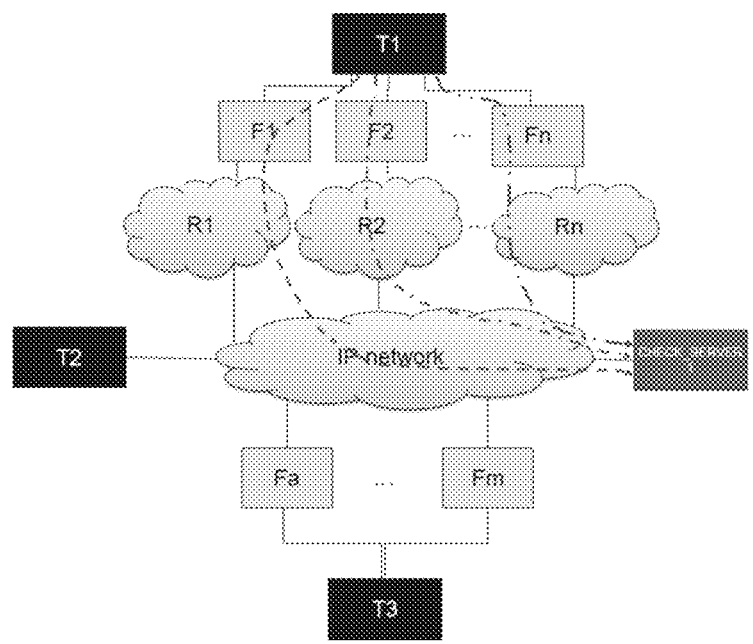
FIG. 5 shows a test procedure executed by a terminal T1 with a test server CHECK_SERVER_1, in an implementation of the invention.

As shown in FIG. 5, it is assumed that the terminal T1 together with the server CHECK_SERVER_1 has performed the above-described implementation of the invention and has concluded that:
  F1 filters MPTCP options;
  F2 only filters MPTCP options from data packets; and
  Fn neither filters nor modifies any MPTCP option.

Figure 6:
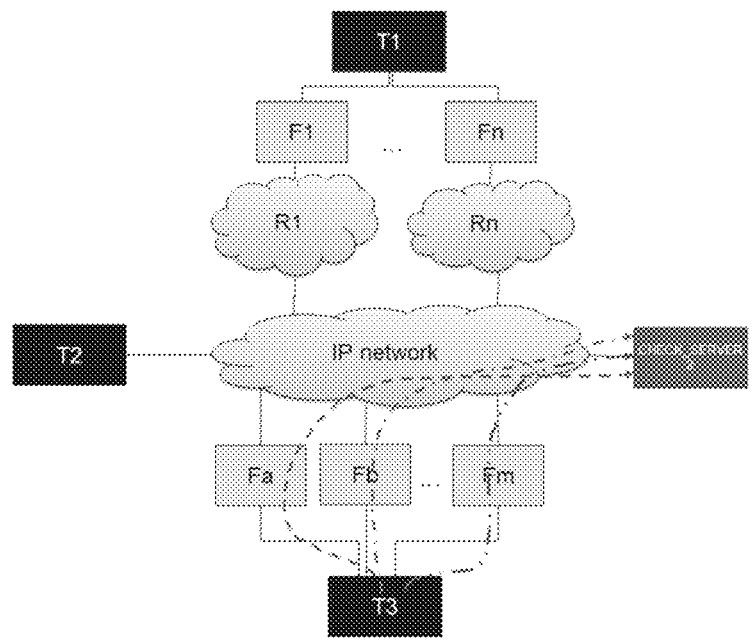
FIG. 6 shows a test procedure executed by a terminal T2 with a test server CHECK_SERVER_2, in an implementation of the invention.

As shown in FIG. 6, it is also assumed that the terminal T3 together with the server CHECK_SERVER_2 has performed the above-described implementation of the invention and has concluded that:
  Fa filters MPTCP options;
  Fb neither filters nor modifies any MPTCP option; and
  Fm neither filters nor modifies any MPTCP option.

Thus, the valid MPTCP paths between T1 and T3 are as follows:
  the path passing via Fn and Fb; and
  the path passing via Fn and Fm.

Finally, it is assumed below that the terminal T1 seeks to set up an MPTCP connection with the terminal T3. FIG. 4 shows the TCP sub-flows set up between the terminals T1 and T3.

The terminal T1 informs the other party that it is compatible with MPTCP connections, but it announces only the path involving Fn. The terminal T3 informs the other party that it is compatible with multipath connections, but it announces only paths involving Fb and Fm. Thus, T1 and T3 can set up:
  a TCP sub-flow involving Fn (at the T1 end) and Fb (at the T3 end); and
  a TCP sub-flow involving Fn (at the T1 end) and Fm (at the T3 end).

Figure 7:
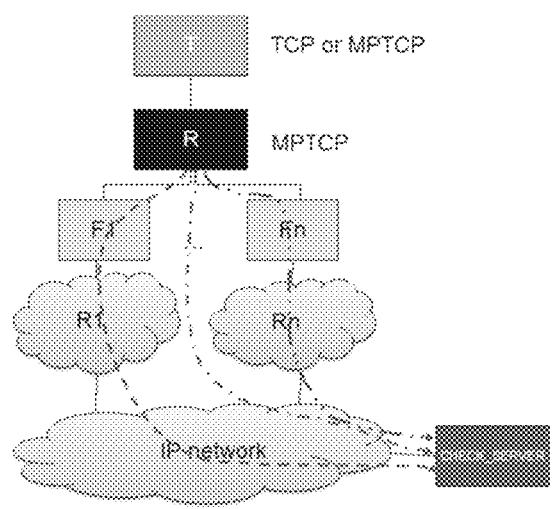
FIG. 7 shows the application of an implementation of the invention to a network configuration including a TCP or MPTCP terminal referenced T in the figure that is placed behind an MPTCP-compatible relay device R.

FIG. 7 shows an application of the invention to a network configuration comprising a terminal T compatible with TCP or MPTCP that lies behind a relay device R (such as a residential gateway or a router) that is MPTCP-compatible and that is suitable for performing the present invention.

The relay device R is connected to one or more IP networks via n connection nodes (F1, F2, . . . , Fn) and n respective access networks R1, R2, . . . , Rn; these connection nodes may host service functions such as a NAT or a firewall, or they may be IP routers that do not include any service function such as a NAT or a firewall.

It should be observed that if the terminal T is compatible with MPTCP, it may perform the present implementation even in the presence of the relay device R. Under such circumstances, the relay device R proceeds as follows.

Firstly, the terminal T executes the above-described steps. For simplification purposes, the relay device R may advantageously be introduced to the terminal T (e.g. by explicit configuration) as being "its" server CHECK_SERVER; to do this, it suffices to configure the terminal T in such a manner that the address of the server CHECK_SERVER is the address of the relay device R.

Thereafter, the relay device R intercepts the test messages sent by the terminal T and responds to each of these messages. For this purpose, it proceeds as follows:
  a) if the relay device R has previously executed a test procedure analogous to that described above with reference to step E2:
    if at least one of the multiple paths known to the relay device R is compatible with MPTCP connections (i.e. if the PATH_CHECKED attribute of at least one of the multiple paths is set to "1", the relay device R responds positively to the terminal T, i.e. it confirms to the terminal T the capacity to set up MPTCP connections;

if none of the multiple paths known to the relay device R is compatible with MPTCP connections (i.e. if the PATH_CHECKED attributes of all of the multiple paths is set to "0"), the relay device R responds negatively to the terminal T, i.e. it informs the terminal that it is not possible for it to make use of the resources of the MPTCP protocol in order to set up a TCP connection with a correspondence;

b) if the relay device R has not yet executed a test procedure analogous to that described with reference to step E2, it causes the test message received from the terminal T to wait and it executes the test procedure with a remote test server; once the test procedure has been completed, the relay device R proceeds as described as a) above.

When the terminal T initializes a multipath TCP connection:

the relay device R routes data packets using the path(s) for which the PATH_CHECKED attribute is set at "1"; and if the relay device R does not have any path available that is compatible with MPTCP connections other than its connection to the terminal T, and if it nevertheless receives a message for initializing a multipath connection from the terminal T, the relay device R does not forward this initialization message to its destination; furthermore, the relay device R responds to the terminal T (thus passing itself off as the party of the terminal T) without including any MPTCP option in its response; T then switches immediately to a simple TCP connection, in compliance with the conventional fallback mode.

The invention may be implemented within nodes of communications networks, e.g. terminals, routers, gateways, NATs, or firewalls, by using software and/or hardware components.

The software components may be incorporated in a conventional computer program for managing a network node. That is why, as mentioned above, the present invention also provides a computer system. The computer system comprises in conventional manner a central processor unit using signals to control a memory, together with an input unit or an output unit. The computer system may also be used for executing a computer program including instructions for performing any of the communications methods of the invention.

Specifically, the invention also provides a computer program as set out briefly above. The computer program may be stored on a computer-readable medium and it may be executed by a microprocessor. The program may use any programming language and may be in the form of source code, object code, or code intermediate between code source and object code, such as in a partially compiled form, or in any other desirable form.

The invention also provides a non-removable, or a partially or totally removable data medium that includes instructions of a computer program as set out briefly above.

The data medium may be any entity or device capable of storing the program. By way of example, the data medium may comprise storage means such as a read only memory (ROM), e.g. a compact disk (CD) ROM or a microelectronic circuit ROM, or magnetic recording means, such as a hard disk, or indeed a universal serial bus (USB) flash drive.

Furthermore, the data medium may be a transmissible medium such as an electrical or optical signal, suitable for being conveyed via an electrical or optical cable, by radio, or by other means. The computer program of the invention may in particular be downloaded from an Internet type network.

In a variant, the data medium may be an integrated circuit in which the program is incorporated, the circuit being adapted to execute or to be used in the execution of any of the communications methods of the invention.

The invention claimed is:

1. An IP network communication method, the method performed in conjunction with a communicating device that is configured to implement a simple transmission control protocol (TCP) connection and to implement a multipath TCP connection, the method comprising:

discovering, by the communicating device, at least one test server that is configured to implement a multipath TCP connection;

attempting to set up at least one multipath TCP connection between the communicating device and the at least one test server along at least one path enabling the communicating device to be reached, wherein during the process of attempting to set up at least one multipath TCP connection, the communicating device determines whether multipath TCP options sent by the communicating device or by the at least one test server have been received correctly by the at least one test server or by the communicating device, by exchanging test data with the at least one test server: and registering, by the communicating device, a status of the at least one path concerning its compatibility with multipath TCP connections, the status being determined as a function of the result of the process of determining whether the multipath TCP options have been received correctly.

2. The method of claim 1 wherein the communicating device comprises:

a client device configured to implement a multipath TCP connection; or a relay device configured to implement a multipath TCP connection and connected to a client device, itself configured to or not configured to implement a multipath TCP connection.

3. The method of claim 2, wherein if the client device configured to implement a multipath TCP connection observes that no paths enabling the client device to be reached are compatible with multipath TCP connections, the method further comprises a process during which the client device uses the simple TCP transport mode to:

set up a connection with another client device; or connect to another client device after receiving a message for setting up a multipath connection sent by that other client device.

4. The method of claim 2 wherein, if the client device configured to implement a multipath TCP connection observes that at least one path enabling the client device to be reached is compatible with multipath TCP connections, the method further comprises a process during which the client device uses multipath TCP options to set up connections with another client device along the at least one path that is compatible with multipath TCP connections.

5. The method of claim 1, wherein the process of discovering at least one test server that is configured to implement a multipath TCP connection comprises:

using, to contact the at least one test server, an address of the at least one test server with which the communication device has been configured; or using a well-known address or domain name of an anycast type to contact the at least one test server.

6. A communicating device configured to implement a simple transmission control protocol (TCP) connection and to implement a multipath TCP connection, wherein the communicating device is further configured to:
   discover at least one test server suitable for implementing a multipath TCP connection;
   attempt to set up at least one multipath TCP connection between the communication device and the at least one test server along at least one communication path between them;
   determine whether multipath TCP options sent by the communicating device or by the test server have been correctly received by the test server or by the communicating device by exchanging test data with the test server during the process of attempting to set up at least one multipath TCP connection; and
   register a status of the path concerning its compatibility with multipath TCP connections based on the result of the process of determining whether the multipath TCP options have been correctly received.

7. The device of claim 6, wherein the communicating device comprises a client device configured to implement a multipath TCP connection.

8. The device of claim 7, wherein the communicating device is further configured to:
   observe that no path enabling the client device to be reached is compatible with multipath TCP connections; and
   using the simple TCP transport mode:
      to set up a connection with another client device; or
      to connect to another client device after receiving a message for setting up
   a multipath connection sent by that other client device.

9. The device of claim 7 wherein the communicating device is further configured to:
   observe that at least one path enabling the client device to be reached is compatible with multipath TCP connections; and
   set up connections with another client device, using the multipath TCP options, along the at least one path that is compatible with multipath TCP connections.

10. The device of claim 6, wherein the communicating device comprises a relay device configured to implement a multipath TCP connection and connected to a client device which is configured or not configured to implement a multipath TCP connection.

11. The device of claim 10, wherein the communicating device is further configured to:
   observe that no path enabling the relay device to be reached, other than its connection to the client device, is compatible with multipath TCP connections; and
   respond to the client device without including any multipath TCP option in a response if the communication device receives a message for initializing a multipath connection from the client device.

12. A non-transitory computer readable medium having stored thereon instructions which, when executed by a processor, cause the processor to perform an Internet Protocol (IP) network communication method, the method involving a communicating device that is configured to implement a simple transmission control protocol (TCP) connection and to implement a multipath TCP connection, the method comprising:
   discovering, by the communicating device, at least one test server that is configured to implement a multipath TCP connection;
   attempting to set up at least one multipath TCP connection between the communicating device and the at least one test server along at least one path enabling the communicating device to be reached, wherein during the process of attempting to set up at least one multipath TCP connection, the communicating device determines whether multipath TCP options sent by the communicating device or by the at least one test server have been received correctly by the at least one test server or by the communicating device, by exchanging test data with the at least one test server; and
   registering, by the communicating device, a status of the at least one path concerning its compatibility with multipath TCP connections, the status being determined as a function of the result of the process of determining whether the multipath TCP options have been received correctly.

13. A computer comprising memory having stored thereon instructions which, when executed by the computer, cause the computer to perform an Internet Protocol (IP) network communication method, the method involving a communicating device that is configured to implement a simple transmission control protocol (TCP) connection and to implement a multipath TCP connection, the method comprising:
   discovering, by the communicating device, at least one test server that is configured to implement a multipath TCP connection;
   attempting to set up at least one multipath TCP connection between the communicating device and the at least one test server along at least one path enabling the communicating device to be reached, wherein during the process of attempting to set up at least one multipath TCP connection, the communicating device determines whether multipath TCP options sent by the communicating device or by the at least one test server have been received correctly by the at least one test server or by the communicating device, by exchanging test data with the at least one test server; and
   registering, by the communicating device, a status of the at least one path concerning its compatibility with multipath TCP connections, the status being determined as a function of the result of the process of determining whether the multipath TCP options have been received correctly.

14. A system comprising:
   at least one test server configured to implement a multipath transmission control protocol (TCP) connection, and
   a communicating device configured to implement a simple transmission control protocol (TCP) connection and to implement a multipath TCP connection, the communicating device further configured to:
   discover the at least one test server;
   send to the at least one test server a request to set up a multipath TCP connection;
   attempt to set up at least one multipath TCP connection with the at least one test server along at least one communication path between them by determining whether multipath TCP options sent by the communicating device or by the at least one test server have been correctly received by the at least one test server or by the communicating device by exchanging test data with the at least one test server; and
   register a status of the path concerning its compatibility with multipath TCP connections, the status being determined as a function of the result of the process of determining whether the multipath TCP options have been received correctly.

* * * * *